(12) United States Patent
McAdams

(10) Patent No.: US 7,111,050 B2
(45) Date of Patent: Sep. 19, 2006

(54) PRIVATE MEMORY ACCESS IN MULTI-NODE SYSTEM

(75) Inventor: Carl C. McAdams, Banks, OR (US)

(73) Assignee: International Business Machines Corporation, Armonk, NY (US)

(*) Notice: Subject to any disclaimer, the term of this patent is extended or adjusted under 35 U.S.C. 154(b) by 341 days.

(21) Appl. No.: 09/921,841

(22) Filed: Aug. 2, 2001

(65) Prior Publication Data

US 2003/0037118 A1    Feb. 20, 2003

(51) Int. Cl.
G06F 15/167 (2006.01)
G06F 9/00 (2006.01)
G06F 9/44 (2006.01)

(52) U.S. Cl. .............. 709/216; 713/100; 717/172; 717/173

(58) Field of Classification Search ............... 709/216; 713/1, 2, 100; 717/172, 173
See application file for complete search history.

(56) References Cited

U.S. PATENT DOCUMENTS

| 5,671,356 | A | | 9/1997 | Wang |
| 5,689,640 | A | * | 11/1997 | Okanoue ............... 709/221 |
| 6,272,629 | B1 | * | 8/2001 | Stewart ................. 713/2 |
| 6,807,643 | B1 | * | 10/2004 | Eckardt et al. ........... 714/36 |
| 2002/0010844 | A1 | * | 1/2002 | Noel et al. ............. 711/153 |
| 2002/0091807 | A1 | * | 7/2002 | Goodman ............... 709/221 |
| 2003/0018926 | A1 | * | 1/2003 | Chen .................... 714/4 |

OTHER PUBLICATIONS

EFI Application Toolkit MP Protocol Specification, Revision 0.9, May 2000, ESG Server Software Technologies (SST), Intel Corp.

* cited by examiner

*Primary Examiner*—Jack A. Lane
(74) *Attorney, Agent, or Firm*—Abdy Raissinia

(57) ABSTRACT

The access of private memory of nodes in a multi-node system is disclosed. A base node of such a coalesced system instructs at least one other node of the system to start a process related to private memory. Each of the other nodes starts the process, where the process access private memory of the node. When the process is finished on a node, the node reports back results of the process to the base node.

16 Claims, 7 Drawing Sheets

AT EACH OTHER NODE

AT EACH OTHER NODE

PRIVATE MEMORY ACCESS IN MULTI-NODE SYSTEM

BACKGROUND OF THE INVENTION

1. Technical Field

This invention relates generally to a computing system in which there are multiple nodes, and more particularly to such a system in which each node has private memory generally accessible only by the node itself.

2. Description of the Prior Art

As computer systems, such as server systems, become more complex, they have been divided into different nodes that operate as separate units. Each node may have its own processors, memory, and input/output (I/O) modules. Functionality performed by a system may be divided among its various nodes, such that each node is responsible for one or more different functions. There is usually a base node, including a keyboard and display, through which a user interacts with the system itself, including the other nodes. Such systems are considered coalesced systems in that the nodes are coalesced to function as a single system. This coalescing is usually transparent to the user. The user typically requests that functionality be performed by the system as a whole, instead of by individual nodes of the system, for instance.

The memory of a node is generally divided into two different types: shared memory, and private memory. Shared memory, as its name implies, is shared among all the nodes. That is, the shared memory of one node is accessible by the other nodes of the system. Private memory of a node, conversely, is accessible only by the node itself. Generally no node, not even the base node, is able to access the private memory of another node. The private memory of a node can include flash memory, expansion read-only memory (ROM), and the memory where error logs and other node-specific information is stored. Firmware for a node is also usually stored in the private memory of the node.

Retrieving diagnostic information from a node, which involves retrieving the errors logs of a node, and updating the firmware of a node, thus must be performed on a per-node basis, instead of on a system-wide basis. Whereas other functionality may be performed for all the nodes of a system through a base node, because the base node does not have access to the private memory of the other nodes, it is unable to retrieve the diagnostic information of another node, nor update another node's firmware. Performing diagnostic and update-oriented functionality therefore must be accomplished on a per-node basis. Where there are a large number of nodes in a given system, this can be very inconvenient and time-consuming for the system administrator.

A limited solution to this problem is described in U.S. Pat. No. 5,671,356, which provides a mechanism by which a node's private resources are accessible to other nodes for pre-boot activities only. One node indicates the type of pre-boot activity to be performed on another node. This latter node is then rebooted, and during the boot process performs the pre-boot activity, accessing its private memory on behest of the former node.

However, this approach is indirect, and requires the rebooting of a node. Therefore, performing diagnostic and update-oriented functionality can still be inconvenient and time-consuming for the system administrator. Furthermore, the system of nodes is still not managed as a whole, but rather as individual nodes on a per-node basis, albeit through the base node, which is also inconvenient for the system administrator. For these described reasons, as well as other reasons, there is a need for the present invention.

SUMMARY OF THE INVENTION

The invention relates to private memory access in a multi-node system. In a method of the invention, a base node of such a coalesced system instructs at least one other node of the system to start a process related to private memory. Each of the other nodes starts the process on itself, where the process access private memory of the node. When the process is finished on a node, the node reports back results of the process to the base node.

A system of the invention includes a number of nodes coalesced to function as the system. The nodes are divided into a base node with which direct user interaction may be achieved, and the other nodes with which indirect user interaction may be achieved through the base node. Each node has private memory, accessible only by the node itself. The base node governs performance by each node of a process related to private memory of the node, to effectuate the user-initiated, system-wide performance of functionality related to private memory. The process is related to private memory based on the functionality initiated.

An article of manufacture of the invention includes a computer-readable medium and means in the medium. The means is for governing performance by each node of a coalesced system of a process related to private memory of each node. The performance is governed to effectuate user-initiated, system-wide performance of functionality related to private memory. The process performed is related to private memory based on the functionality initiated.

Other features and advantages of the invention will become apparent from the following detailed description of the presently preferred embodiment of the invention, taken in conjunction with the accompanying drawings.

DESCRIPTION OF THE PREFERRED EMBODIMENT

Overview

Figure 1:
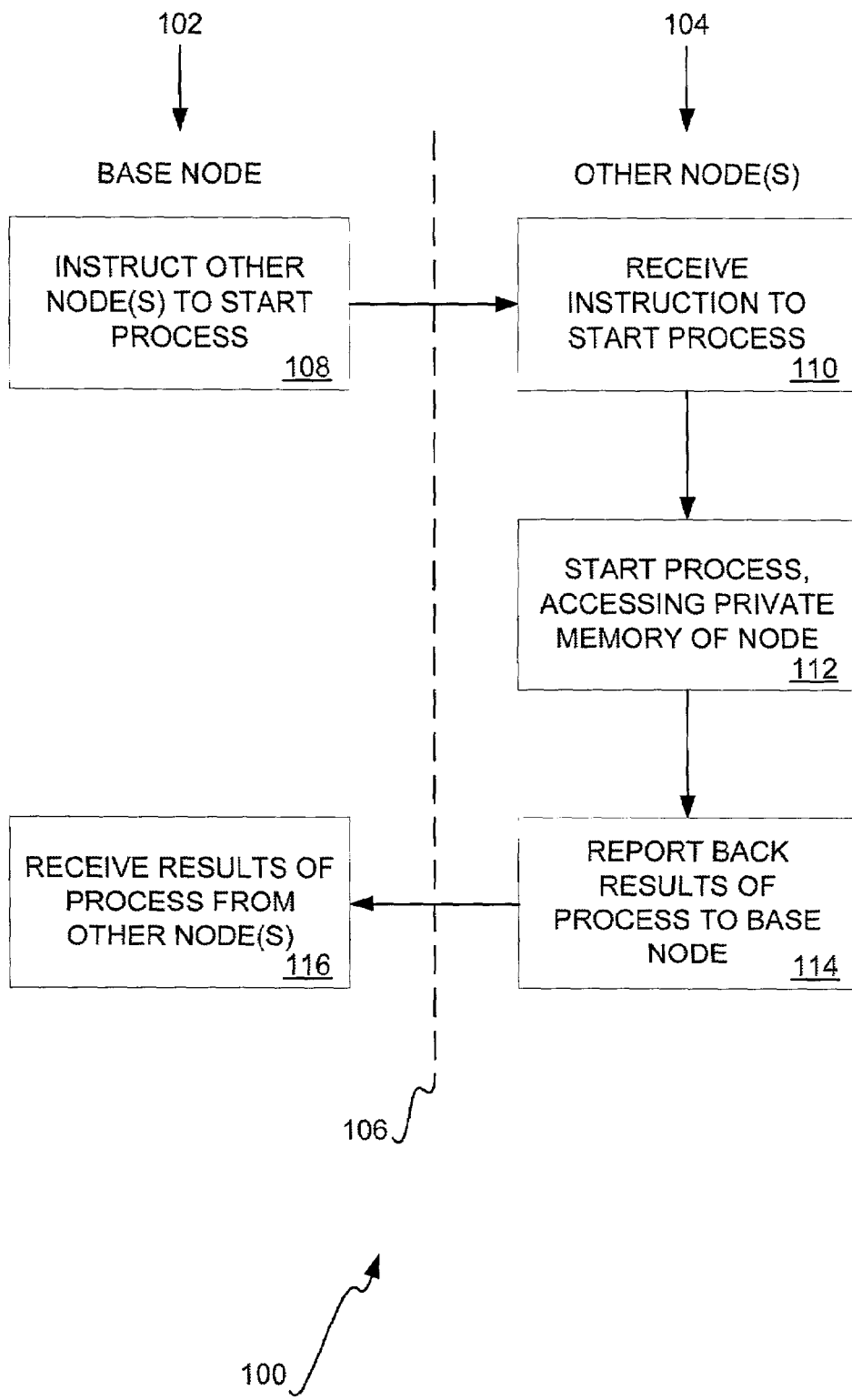
FIG. 1 is a flowchart of a method according to a preferred embodiment of the invention, and is suggested for printing on the first page of the issued patent.

In the preferred embodiment of the invention, a base node governs user-initiated, system-wide performance of functionality related to private memory. FIG. 1 depicts a method 100 according to such a preferred embodiment. The various parts of the method 100 are performed by the base node and the other nodes of the system, as indicated by the columns 102 and 104, respectively, which are separated by the dotted line 106. The base node instructs the other nodes to start a process related to the private memory of the other nodes (108). The other nodes of the system each receive this instruction (110), and start the process, which accesses the private memory of the nodes (112), preferably without rebooting. The other nodes report back the results of performing the process to the base node (114), which receives these results (116).

Embodiments of the invention may be systems, nodes, methods, and articles of manufacture of varying limitations. In the case of systems and nodes, embodiments of the invention may be implemented in conjunction with server systems and other types of systems. In the case of methods, embodiments of the invention may be performable by individual nodes, as well as by the system as a whole. In the case of articles of manufacture, an article includes a computer-readable medium on which there is a means for performing functionality according to an embodiment of the invention. The computer-readable medium may itself be a recordable data storage medium, such as a hard disk drive or a floppy disk, or another type of computer-readable medium.

Technical Background

Figure 2:
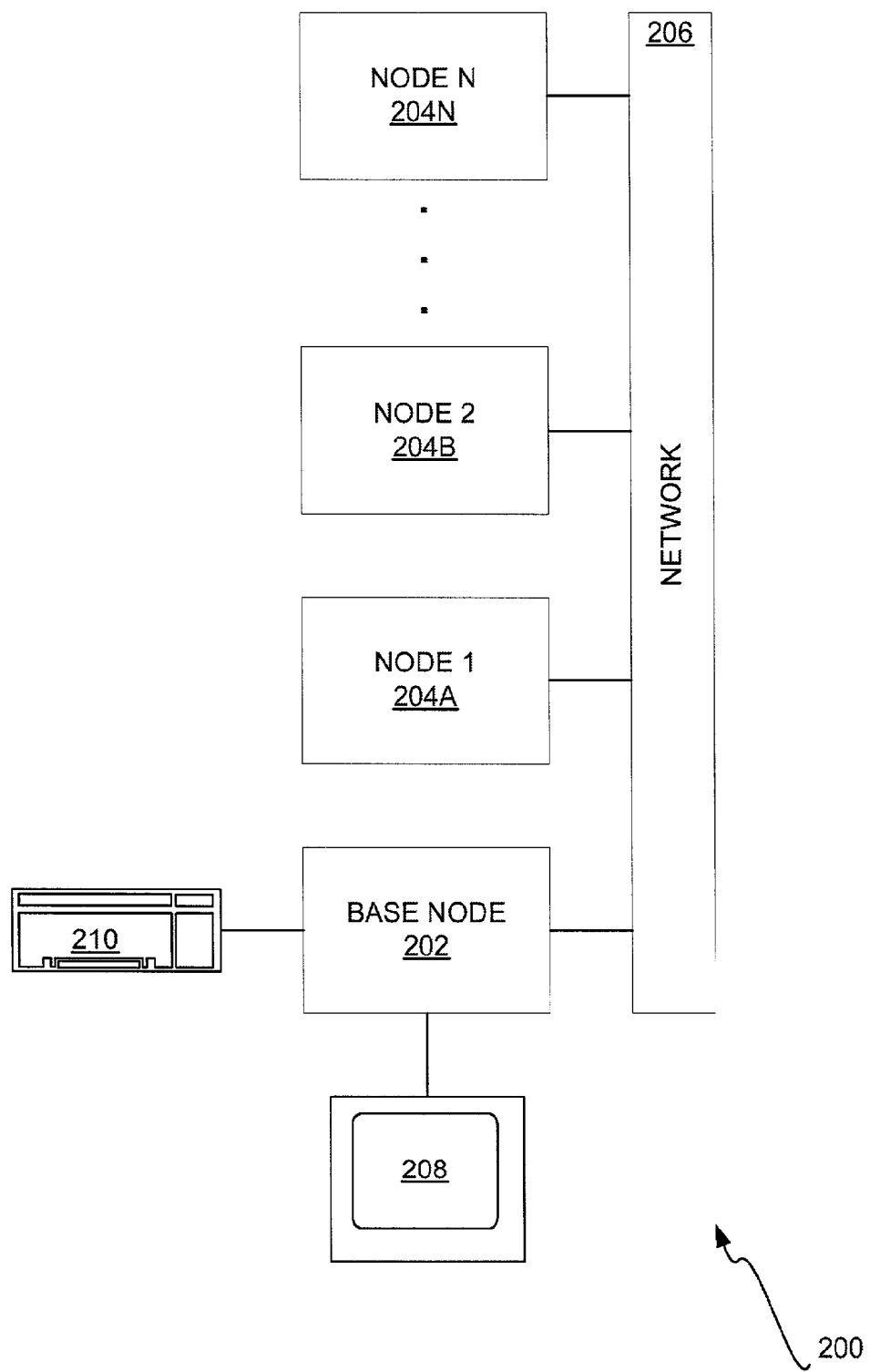
FIG. 2 is a diagram of an example multi-node system in conjunction with which embodiments of the invention may be implemented.

FIG. 2 shows a coalesced multi-node system 200 in conjunction with which embodiments of the invention may be implemented. The system 200 includes a base node 202, and other nodes 204A, 204B, . . . , 204N. The nodes are coalesced to function as the system 200, such that functionality can be initiated on a system-wide basis, as opposed to only a per-node basis. Direct user interaction is achieved through the base node 202, via the display 208 and the keyboard 210 connected to the base node 202. Indirect user interaction with the other nodes 204A, 204B, . . . , 204N is achieved through the base node 202. The base node 202 and the nodes 204A, 204B, . . . ., 204N are connected to one another through a network 206. The network 206 may be as simple as a back plane or cabling connecting the nodes, or may be as advanced as an Infiniband or other type of network. The network 206 thus assists coalescing of the nodes 202 and 204A, 204B, . . . , 204N as the system 200.

Figure 3:
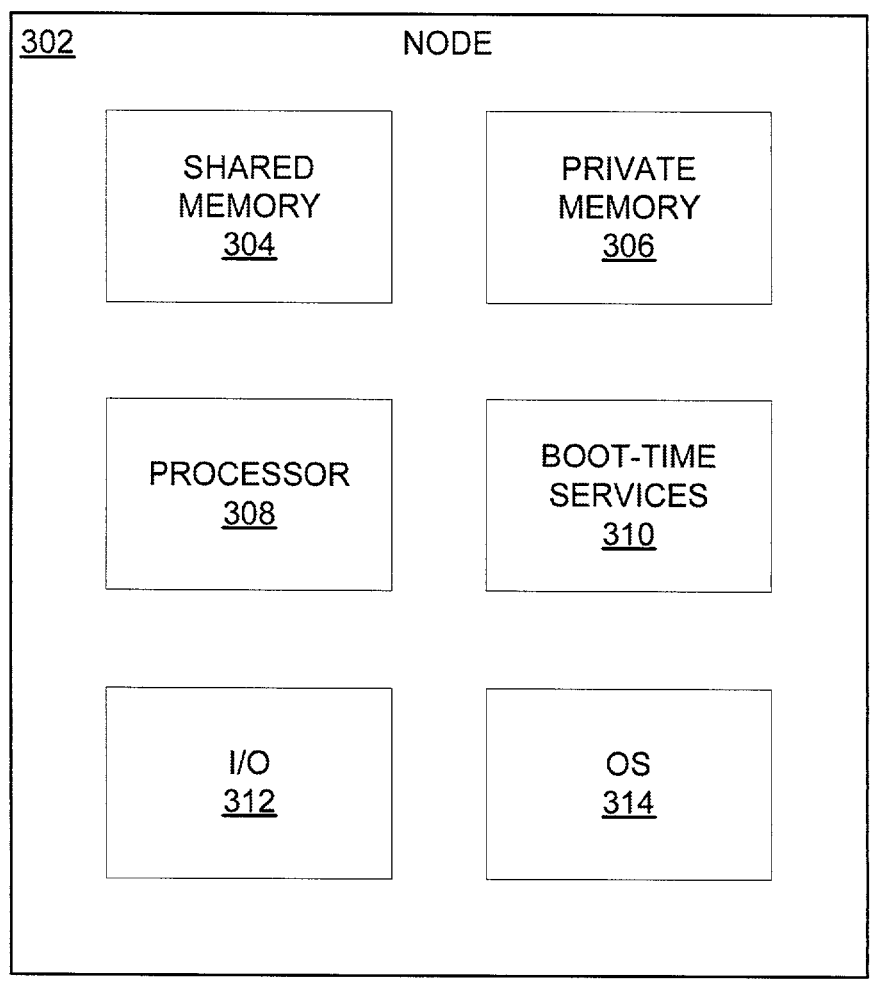
FIG. 3 is a diagram of an example node that may be a part of a multi-node system, such as that of FIG. 2, and in conjunction with which embodiments of the invention may be implemented.

FIG. 3 shows in more detail an example node 302 that can function as the base node 202 and/or the nodes 204A, 204B, . . . , 204N of FIG. 2. The node 302 includes shared memory 304, private memory 306, a processor 308, boot-time services 310, input/output (I/O) modules 312, and an operating system (OS) 314. Other components of the node 302 may also be present, either in addition to or in lieu of the depicted components of the node 302 in FIG. 3. The example node 302 is shown for illustrative and example purposes only, and does not represent a limitation on the invention itself. The node 302 may be a computing device, such as a computer, or a non-computing device, such as a peripheral or other type of device.

The shared memory 304 of the node 302 is memory that is accessible by all the nodes within the coalesced system of which the node 302 is a part. Conversely, the private memory 306 of the node 302 is memory that is directly accessible only by the node 302, and not by the other nodes of the system of which the node 302 is a part. The private memory 306 can include flash memory, expansion read-only memory (ROM), error log memory, and firmware memory, among other types of private memory. The processor 308 may be a service processor (SP) of the node, or another type of processor. The I/O modules 312 may include the necessary memory and hardware interconnections that enable the components of the node 302 to communicate with one another, as well as with other nodes and the components of other nodes of the system of which the node 302 is a part.

The boot-time services 310 include those services that the node 302 is able to perform while booting up. Such services 310 are typically stored in the firmware of the node 302, which is a part of the private memory 306 of the node 302. The services 310 may be according to the Extensible Firmware Interface (EFI) specification, or another type of specification, standard, or protocol. The OS 314 governs operation of the node 302 after booting up. The OS 314 typically interacts with the operating systems of the other nodes of the system of which the node 302 is a part, such that the system is coalesced to perform functionality as initiated by the user on a system-wide basis, as opposed to a per-node basis.

General Embodiment

Figure 4:
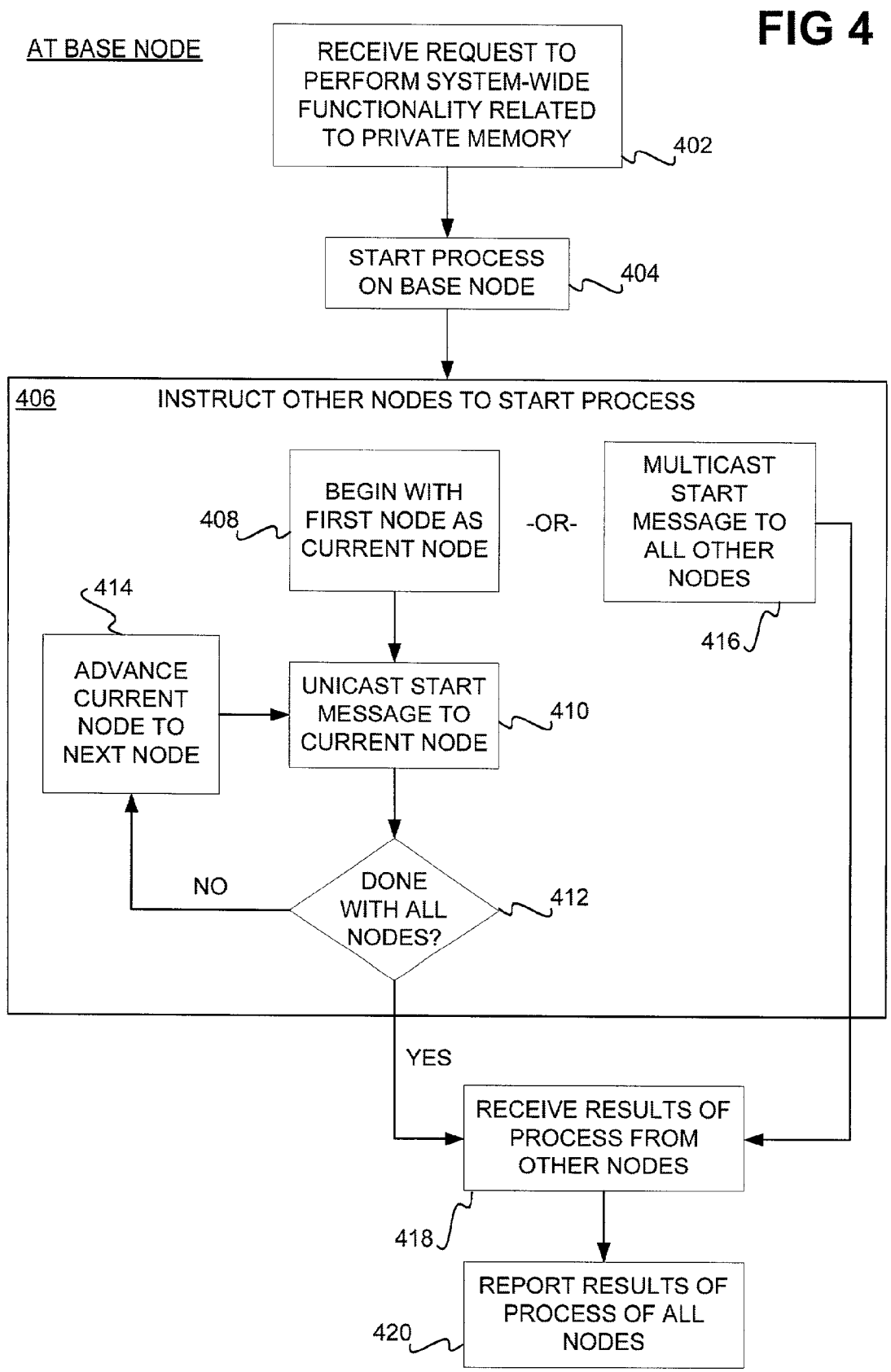
FIGS. 4 and 5 are flowcharts of methods performable by a base node of a system and each other node of the system, respectively, according to a general embodiment of the invention.
Figure 5:
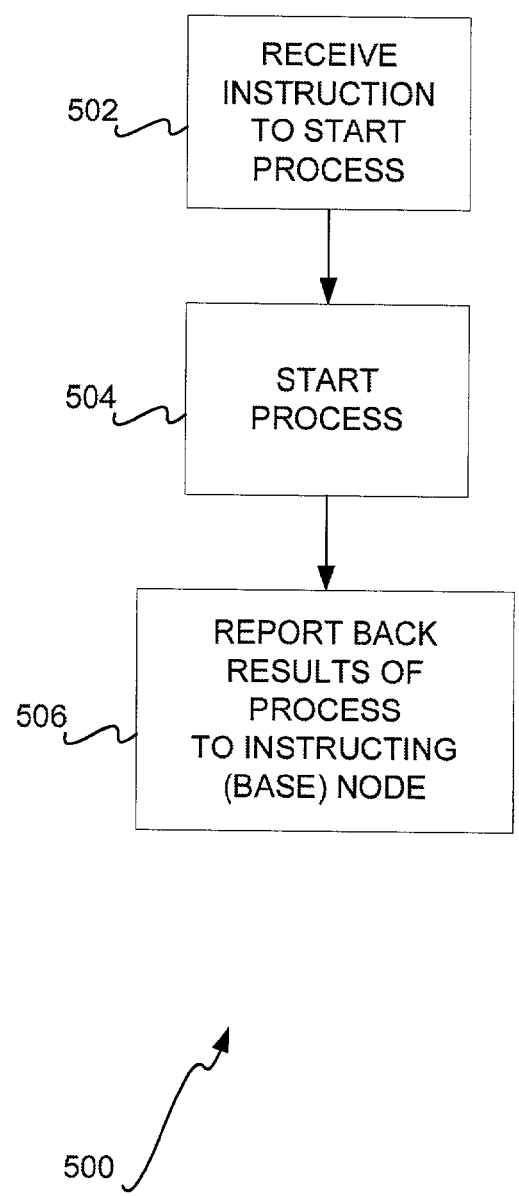

FIGS. 4 and 5 show methods 400 and 500 according to a general embodiment of the invention, as performed at a base node and at other nodes of a system, respectively. The methods 400 and 500 can be implemented in conjunction with the system of FIG. 2 and the node of FIG. 3 that have been described. Furthermore, the methods 400 and 500 are consistent with the preferred method of FIG. 1 that has been described.

In FIG. 4, the base node first receives a request to perform system-wide functionality related to private memory (402). This request may be received from a user initiating the performance of such functionality, for example. The system-wide functionality related to private memory may be the updating of firmware of all the nodes, the retrieval of diagnostic information from all the nodes, or another type of functionality related to private memory.

The base node starts a process on itself (404). The process relates to the private memory of the base node, based on the system-wide functionality requested. For example, where the system-wide functionality is the updating of firmware of all the nodes, the process may be the updating of the firmware of the base node itself. The base node next instructs the other nodes to start the process on themselves, too (406). This instruction may be a unicast process to each of the other nodes, as indicated by 408, 410, 412, and 414, or may be a multicast process to all of the other nodes at once, as indicated by 416. With specific respect to the multicast process, the base node multicasts a start process message to all the other nodes (416), so that the other nodes also run the process related to the private memory that was previously started on the base node.

With specific respect to the unicast process, the base node begins with the first of the other nodes as the current node (408), and unicasts a start message to this current node (410). The start message is so that this current node also runs the process related to the private memory that was previously started on the base node. If there are other nodes (412), then the current node is advanced to the next node (414), and a start message is unicast to the new current node (410). This process continues until the base node has finished unicasting a start message to all the other nodes (412). In either the unicast or the multicast process, the furnishing of start messages may be accomplished in accordance with a given standard, specification, or protocol. For example, the start message may be sent by the base node to the other nodes in accordance with a multiprocessor protocol (MPP), such as that specified by the Extensible Firmware Interface (EFI)

Application Toolkit MPP Specification. This specification is generally available in the EFI Application Toolkit at the web site http://developer.intel.com/technology/efi/index.htm, maintained by the Intel Corp. of Santa Clara, Calif.

The base node then receives results of the performance of the process from the other nodes (418). The processes of the other nodes may directly send their results to the base node, or the base node may itself retrieve the results from the other nodes. Along with the results of the running of the process on itself, the base node finally reports the results of the running of the process on the other nodes to the user who had initiated performance of the system-wide functionality related to private memory (420). Thus, by having processes run on all the nodes as governed by the base node, private memory is seemingly accessible by the base node itself, on a system-wide basis.

In FIG. 5, each other node receives the instruction to start the process as sent by the base node (502), and starts the process (504). The process is preferably the same process that the base node ran on itself, and thus relates to private memory of the node that started the process. The results of performing the process are then reported back to the instructing node, the base node (506). In this way, each node runs the process related to private memory, and the base node assimilates the results, such that it appears that the base node is performing system-wide functionality as to the private memory of each of the nodes.

More Specific Embodiment

Figure 6:
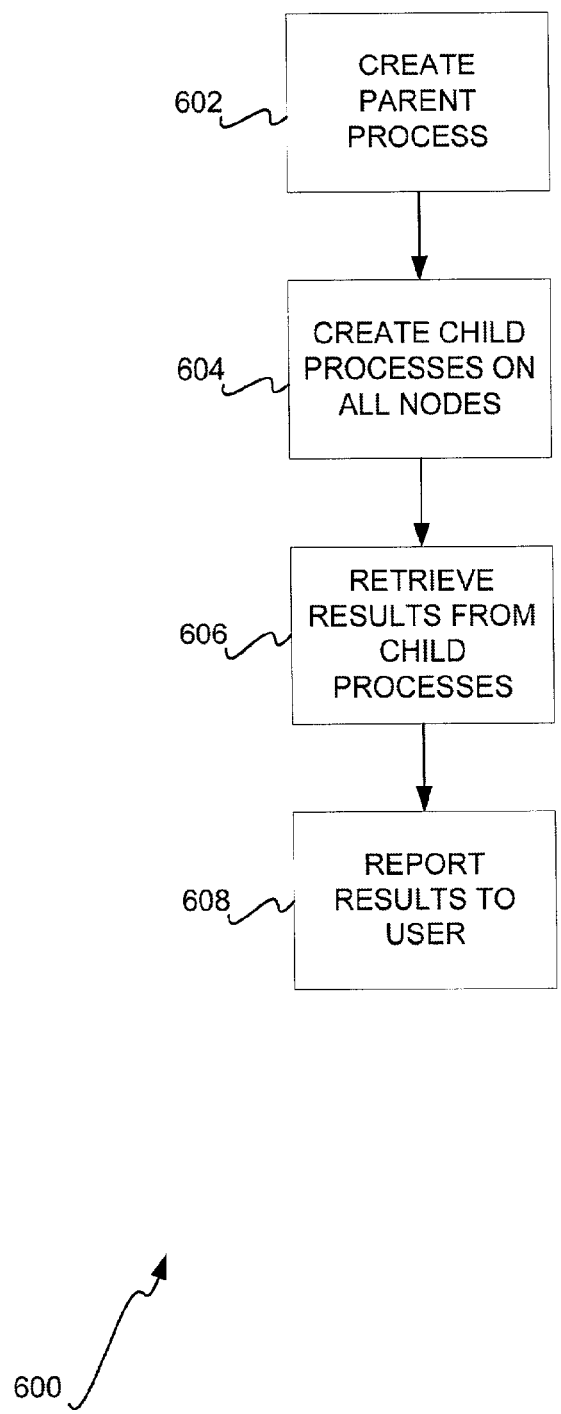
FIGS. 6 and 7 are flowcharts of methods performable by a base node of a system and each other node of the system, respectively, according to a more specific embodiment of the invention.
Figure 7:
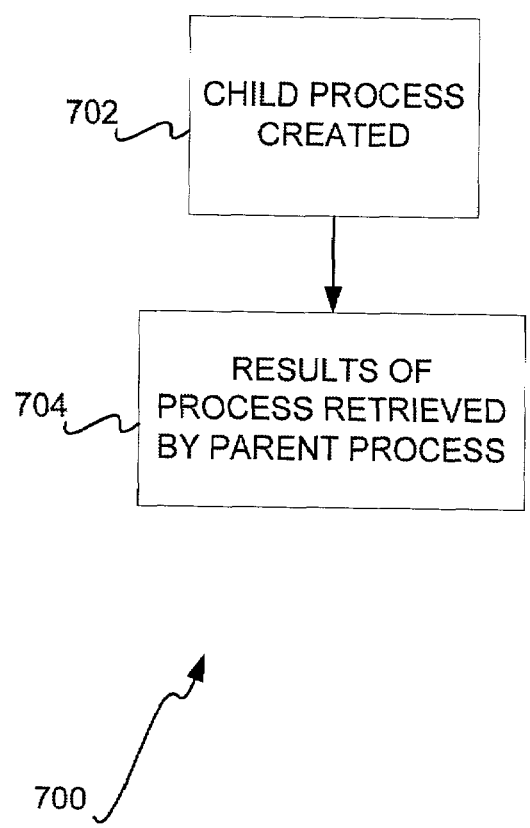

FIGS. 6 and 7 show methods 600 and 700 according to a more specific embodiment of the invention, as performed at a base node and at other nodes of a system, respectively. The methods 600 and 700 are consistent with the general methods of FIGS. 4 and 5 that have been described, and can be implemented in conjunction with the system of FIG. 2 and the node of FIG. 3 that have been described. Furthermore, the methods 600 and 700 are consistent with the preferred method of FIG. 1 that has been described.

In FIG. 6, the base node creates a parent process that is responsible for ensuring that user-initiated, system-wide functionality as to the private memory of the nodes of a system is performed (602). The parent process creates child processes on all the nodes, including the base node (604). The child process is specifically related to the private memory, and performs functionality based on and consistent with the system-wide functionality that the user has initiated. Whereas the parent process governs the performance of the system-wide functionality on the nodes, the child processes are the processes that actually perform this functionality on a given node. The parent process retrieves the results of the child processes from them (606), and then reports the results back to the user (608).

In FIG. 7, a child process is created at a node (702), where the child process is responsible for performing the functionality based on and consistent with the system-wide functionality the user has initiated. The processor of the node that runs the child process may be then be left spinning, such that it is in a state where the processor is awaiting further instruction or action by the parent process. This action is the retrieval of the results of the child process by the parent process running on the base node (704). After such retrieval, the processor of the node that ran the child process reverts back to its previous, pre-child process state.

Advantages Over the Prior Art

Embodiments of the invention provide for advantages over the prior art. The user can initiate system-wide functionality that relates to private memory of nodes, without reverting to per-node performance as in the prior art. Where the prior art only allows such private memory-accessing functionality to be performed on a system-wide basis with the rebooting of all the nodes, the invention provides for such functionality to be performed on a system-wide basis without rebooting. The base node governs the performance of this system-wide functionality, but the user him or herself does not have to initiate such performance on a per-node basis, but rather initiates the performance completely through the base node.

Alternative Embodiments

It will be appreciated that, although specific embodiments of the invention have been described herein for purposes of illustration, various modifications may be made without departing from the spirit and scope of the invention. For example, whereas an embodiment of the invention has been described as capable of being implemented with the EFI Application Toolkit Multi-Processor (MP) Protocol Specification, the invention itself does not rely on the EFI Application Toolkit, and can be implemented in accordance with other multi-processor synchronization methods, as well as with other protocols, standards, and specifications. Accordingly, the scope of protection of this invention is limited only by the following claims and their equivalents.

I claim:

1. A method comprising:
   instructing by a base node of a coalesced system to at least one other node of the coalesced system to start a process related to private memory that is firmware, each of the base node and the at least one other node including one or more processors, memory, and input/output (I/O) modules, the process relating to updating the firmware of the at least one other node;
   starting the process by each of the at least one other node on each of the at least one other node, the process accessing private memory that is firmware on each of the at least one other node; and,
   reporting back results of the process by each of the at least one other node to the base node,
   wherein the method is performed without rebooting of any of the at least one other node, such that the firmware of the at least one other node is updated without rebooting of any of the at least one other node.

2. The method of claim 1, further initially comprising receiving a request from a user to perform system-wide functionality related to private memory that is firmware, the process related to private memory that is firmware based on the system-wide functionality requested.

3. The method of claim 1, further initially comprising starting the process by the base node on the base node, the process accessing private memory that is firmware of the base node.

4. The method of claim 1, further comprising prior to starting the process by each of the at least one other node, receiving instruction from the base node by each of the at least one other node to start the process related to private memory that is firmware.

5. The method of claim 1, further comprising receiving the results of the process from each of the at least one other node by the base node.

6. The method of claim 5, further comprising reporting the results received back from each of the at least one other node by the base node to a user having previously requested system-wide functionality related to private memory that is firmware be performed, the process related to private memory that is firmware based on the system-wide functionality requested.

7. The method of claim 1, wherein instructing by the base node to the at least one other node to start the process related to private memory that is firmware comprises one of multicasting a start-process message by the base node to the at least one other node and unicasting the start-process message by the base node to each of the at least one other node.

8. The method of claim 1, wherein instructing by the base node to the at least one other node to start the process related to private memory that is firmware comprises creating a parent process by the base node at the base node and creating a child process by the parent process at each of the at least one other node.

9. A system comprising:
  a plurality of nodes coalesced to function as the system and divided into a base node allowing direct user interaction therewith and other nodes allowing indirect user interaction therewith through the base node, each node including one or more processors, memory, and input/output (I/O) modules; and,
  private memory that is firmware at each of the plurality of nodes, the private memory that is firmware of a node accessible only by the node,
  the base node governing performance by each of the plurality of nodes of a process related to private memory that is firmware of each of the plurality of nodes to effectuate user-initiated, system-wide performance of functionality related to private memory that is firmware, the process related to private memory that is firmware based on the functionality initiated and relating to updating the firmware of each of the plurality of nodes, the functionality not resulting in rebooting of any of the plurality of nodes, such that the firmware of each of the plurality of nodes is updated without rebooting of any of the plurality of nodes.

10. The system of claim 9, further comprising a network to which each of the plurality of nodes is connected such that the network assists coalescing of the plurality of nodes as the system.

11. The system of claim 9, further comprising at least one of a keyboard and a display connected to the base node to assist direct user interaction with the base node.

12. The system of claim 9, wherein at least one of the plurality of nodes each comprise a non-computer device having a processor in addition to having the private memory that is firmware.

13. The system of claim 9, wherein the base node governs the performance by each of the plurality of nodes of the process to effectuate the user-initiated, system-wide performance of functionality related to private memory that is firmware by employing a multi-processor protocol (MPP).

14. The system of claim 13, wherein the MPP is part of one of an operating system (OS) of the base node and boot-time services of the base node.

15. An article comprising:
  a computer-readable medium; and,
  means in the medium for governing performance by each of a plurality of nodes coalesced to function as a system of a process related to private memory that is firmware of each of the plurality of nodes, to effectuate user-initiated, system-wide performance of functionality related to private memory that is firmware, the process related to private memory that is firmware based on the functionality initiated and related to updating the firmware of each of the plurality of nodes, the functionality not resulting in rebooting of any of the plurality of nodes, such that the firmware of the plurality of nodes is updated without rebooting of any of the plurality of nodes,
  wherein each of the plurality of nodes includes one or more processors, memory, and input/output (I/O) modules.

16. The article of claim 15, wherein the medium is a recordable data storage medium.

* * * * *